Jan. 27, 1942. C. GARDNER 2,271,068
ENGINE
Original Filed March 25, 1933 3 Sheets-Sheet 1

INVENTOR.
Cummings Gardner
BY
F. Bascom Smith
ATTORNEY.

Jan. 27, 1942.  C. GARDNER  2,271,068
ENGINE
Original Filed March 25, 1933  3 Sheets-Sheet 2
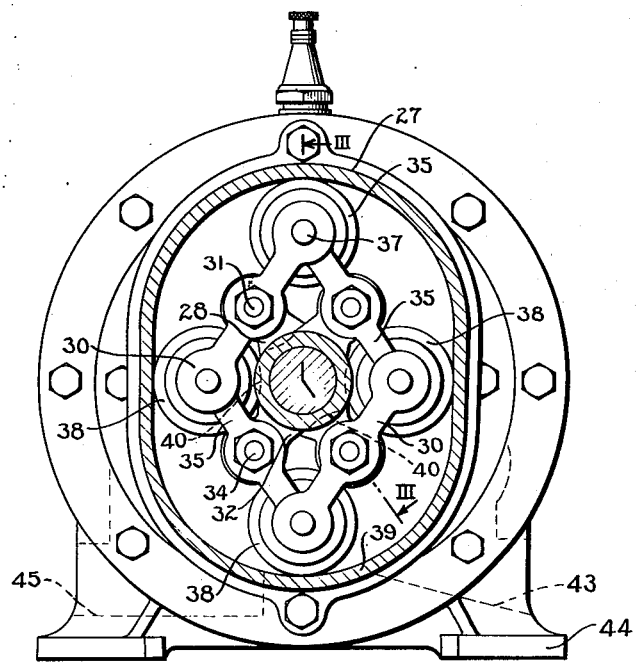
Fig 2
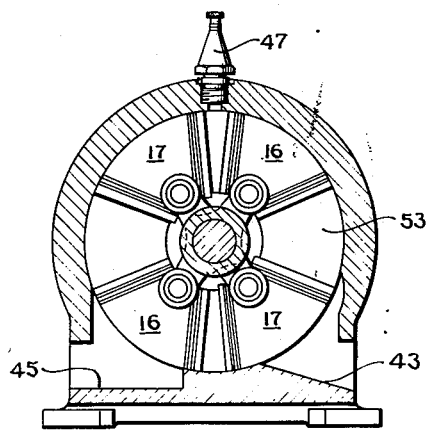
Fig 3
Fig 4
INVENTOR.
Cummings Gardner
BY
F. Bascom Smith
ATTORNEY.

Jan. 27, 1942.  C. GARDNER  2,271,068
ENGINE
Original Filed March 25, 1933   3 Sheets-Sheet 3

INVENTOR.
Cummings Gardner
BY
F. Bascom Smith
ATTORNEY.

Patented Jan. 27, 1942

2,271,068

UNITED STATES PATENT OFFICE 2,271,068

ENGINE

Cummings Gardner, Los Angeles, Calif., assignor to Rotomotor Corporation, Washington, D. C., a corporation of Delaware Original application March 25, 1933, Serial No. 662,702. Divided and this application January 18, 1939, Serial No. 251,485

7 Claims. (Cl. 230—144)

This invention relates to power plants, and more particularly to internal combustion engines of the rotary type.

This is a divisional application based on applicant's co-pending application Serial No. 662,702, filed March 25, 1933, and now issued as Patent No. 2,147,290, of February 14, 1939.

One of the objects of the present invention is to provide a novel double rotary unit, such as an engine and a compressor, each embodying relatively movable, sector-like pistons in combination with common control means therefor.

Another object is to provide a novel power plant, particularly adapted for use in aircraft, the construction being such that a straight and hollow power shaft may be used.

The above and further objects and novel features will more fully appear hereinafter when the detailed description is read in connection with the accompanying drawings. It is to be expressly understood, however, that the drawings are for purposes of illustration only and are not definitions of the limits of the invention, reference being had for this purpose to the appended claims.

Referring to the drawings, wherein like numerals refer to like parts throughout the several views, Fig. 1 is a side elevation, partly in section and with parts broken away, of one embodiment of a rotary internal combustion engine and a compressor in combination therewith;

Fig. 2 is a sectional view taken on line II—II of Fig. 1;

Fig. 3 is a detail view, partly in section and with parts broken away, the view being taken substantially on line III—III of Fig. 2;

Fig. 4 is a detail view, partly in section, illustrating certain parts of the mechanism in firing position;

Figure 1:
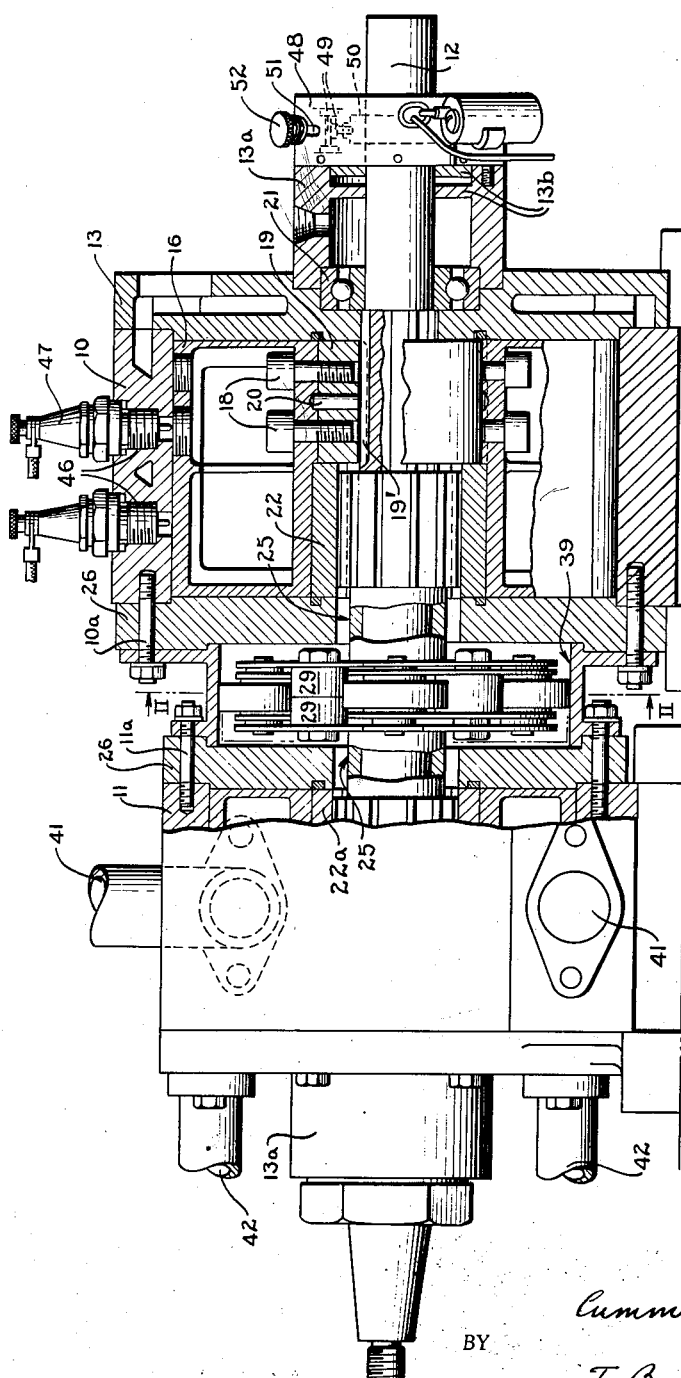

The form of the invention illustrated in the accompanying drawings, by way of example, comprises an engine having a cylinder 10 and a compressor having a cylinder 11, the cylinders being coaxially disposed and having a power shaft 12 extending therethrough. The outer ends of the cylinders are enclosed by plates 13. The inner ends of the cylinders are enclosed in a manner to later appear. An oil reservoir comprising a cylindrical vessel 13a having a suitable end plate 13b is positioned adjacent the center of plate 13 to receive a lubricant under pressure which may flow internally to cylinders 10 and 11 through suitable conduits (not shown).

The piston arrangements within cylinders 10 and 11 are duplicates, with the exception that the latter cylinder and the arrangement therein is smaller than the former. Therefore, it is necessary that only the pistons shown, for example, in the right-hand cylinder be illustrated and described in detail.

Figure 6:
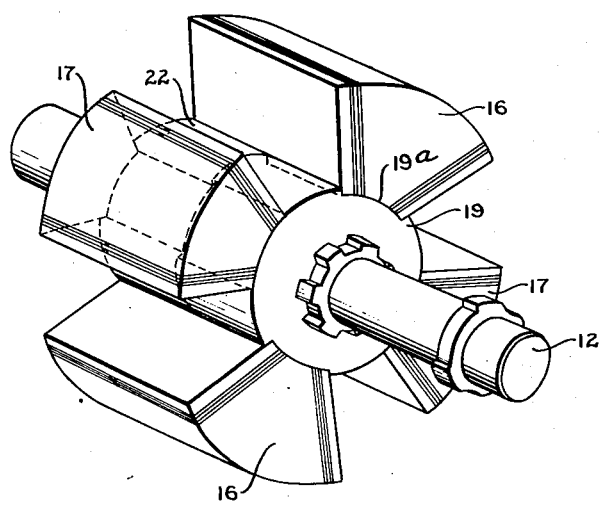
Fig. 6 is a detail perspective view illustrating a preferred mounting for the pistons.

A plurality of sector-shaped pistons 16 and 17 (Fig. 6) are mounted for rotation within the cylinder 10. In the embodiment shown, four pistons are employed in each cylinder, the pistons being arranged in diametrically-disposed and rigidly connected pairs. Piston 16 is secured as by means of allenhead screws 18 which pass through the inner walls of said pistons to a hub 19 which is substantially one-half the length of said pistons, one end of the hub being substantially flush with one end of the piston. Preferably, the hub is provided with a longitudinally extending recess or groove 19a (Fig. 6) to receive a portion of the piston which projects slightly from the inner face of the latter, the projecting portion being substantially one-half the length of the piston, i. e., equal to the length of the hub 19. This construction, together with screws 18 and a dowel pin 20, insures an extremely rigid connection between the pistons and the hub 19. The latter is rigidly connected as by means of splines 19' (Fig. 1) to the power shaft 12 which may be termed a cylinder power shaft.

The opposite ends of the cylinder power shaft are rotatably mounted in bearings 21 which are located in each of the outer end plates of cylinders 10 and 11.

Surrounding the power shaft 12 within the cylinder but annularly spaced therefrom is a second hub 22 of the same length and outer diameter as hub 19. Piston 17 (Fig. 6) is secured to this second hub in the same manner as the first-named pair of pistons are secured to hub 19. It will thus be seen that one-half of the pistons 16 overhang the hub 22, while one-half of the pistons 17 overhang the hub 19.

The relative angular movements between pistons 16 and 17 of cylinder 10 and analogous pistons 23 and 24 within the cylinder 11 must be controlled in a predetermined manner in order, for example, to create within the cylinder 10 a suction whereby a combustible mixture may be drawn into the engine to compress the charge thus introduced prior to the firing of the charge, and subsequently to exhaust the burned gases from the cylinder. Control means are provided for this purpose and in addition said control means are effective to convert the forces of explosion in the cylinder into a torque which is transmitted to power shaft 12 to rotate the same. Since common control means are employed for both cylinders, a similar motion is imparted to pistons 23 and 24 for purposes of compressing a suitable fluid in a manner to appear later.

Figure 5:
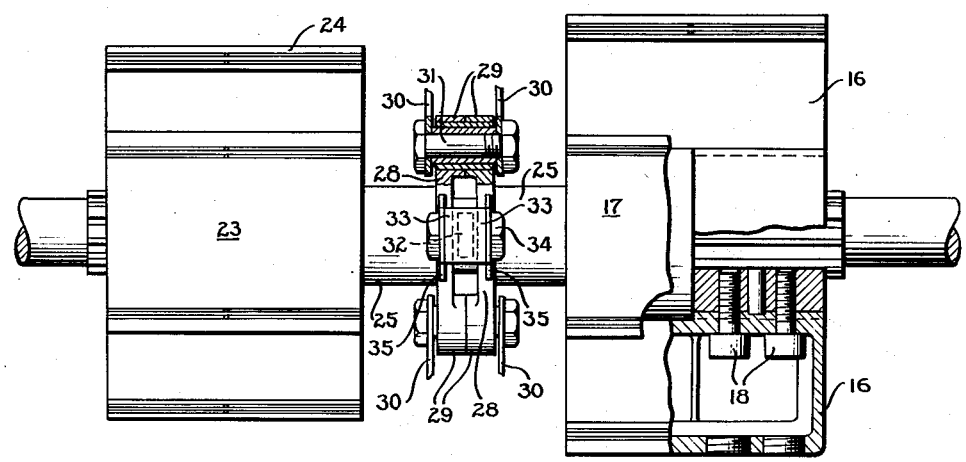
Fig. 5 is a detail view, partly in section and with parts broken away, illustrating one form of control means for the cylinders which may be employed in the present invention.

The above mentioned common control means comprise, in the form shown, sleeves 25 which are splined to hub 22 within cylinder 10 and to an analogous hub 22a within cylinder 11. The sleeves extend through openings in suitable adjacent end plates 26 of the cylinders into a housing 27 for said control mechanism, the housing being secured by any suitable means, such as studs 10a and 11a extending through flanges of the housing, to the adjacent ends of cylinders 10 and 11 respectively. Each sleeve 25 is provided with a pair of diametrically disposed arms 28 (Fig. 5) provided at the outer ends thereof with apertured and longitudinally extending portions 29, the adjacent ends of said portions being in abutting engagement. Pairs of links 30 are pivotally connected intermediate their extremities to the arms 28 as by means of suitable pivot pins 31 which extend through portions 29.

Shaft 12 is provided with a pair of diametrically disposed arms 32, the outer ends of which carry longitudinally extending apertured portions 33 to which are pivoted, intermediate their extremities, by means of bolts 34, suitable links 35 which are similar to links 30.

The outer ends of links 35 are apertured to receive a sleeve 36 (Fig. 3) which surrounds a pivot pin 37 having the opposite ends thereof of reduced diameter. The pairs of links 30 have pivotal connection with the reduced ends of the pins 37 and as above mentioned, are pivoted intermediate their ends on pins 31. There is thus provided a parallelogram comprising two pairs of links 35 and two pairs of links 30, all of which are of the same length as are the pairs of arms 28 and 32.

Means are provided for insuring that the linkage above described will impart a predetermined oscillation to the pistons 17 and 23 and pistons 16 and 24 relative to power shaft 12, whereby said pistons will have the necessary relative angular movement to carry out the firing and compressing cycle referred to above. For this purpose sleeves 36 carry anti-friction rollers 38, one roller being provided for each corner of the linkage parallelogram, said rollers having engagement with an internal cam 39 which, in the form shown, is constituted by the inner wall of housing 27. Preferably, the cam is generally elliptical in shape, the opposite end walls thereof being substantially semi-circular while the side walls are parallel for a major portion of their length. It will be noted that arms 28 and 32, having the projecting apertured portions, are recessed as at 40 to provide clearance for rollers 38, thus permitting the use of rollers of large diameter.

Since the control means moves the pistons 23 and 24 twice to a compressing position during each revolution of said pistons, the compressor preferably includes two intake ports 41 and two outlet ports 42. Intake openings 43 are provided for the cylinder 10 closely adjacent a cylinder base 44, which may be cast integrally with the cylinder if desired. Cylinder 10 is also provided with an exhaust port 45 and with one or more threaded openings 46 to receive spark plugs 47. As will be understood by those skilled in the art, openings 43 may be operatively associated with one or more carburetors (not shown).

A timer mechanism is provided for controlling the flow of current from a source such as a battery (not shown) to spark plugs 47. The mechanism, in the form shown, comprises a flanged housing 48 secured to the oil reservoir 13a by suitable means (not shown). The housing surrounds shaft 12. Positioned for limited angular movement within housing 48 is a ring (not shown) carrying contacts 49, one of which is preferably stationary and the other adapted for movement into and out of engagement therewith, said movement being produced by a cam 50 mounted upon shaft 12 within housing 48. A suitable pin (not shown) attached to said ring projects through an elongated slot 51 in housing 48 and is provided with a knurled head 52. Movement of said head and pin therefore will advance or retard the spark.

In operation, a starter mechanism (not shown) which may have operative engagement with the projecting portion of shaft 12, is employed to rotate said shaft and the pistons 16, 17 and 23, 24. As the pistons 16, 17 rotate past inlet 43 (Fig. 4) the control means, including the cam 39, are effective to retard the annular movement of pistons 17 relative to the constantly moving pistons 16. A chamber 53 provided between the adjacent faces of said pistons and the cylinder wall is thereby increased in volume and the suction thus produced is effective to draw a combustible charge into the chamber. Further rotation of the pistons and the elements of the control means is effective to increase the speed of pistons 17 with respect to pistons 16, whereupon the volume of chamber 53 is decreased and the combustible charge is compressed. When the pistons have rotated to such a position that the compressed charge in chamber 53 is opposite the spark plugs 47, the timer is effective to close the circuit to the plug, thereby igniting the charge. The linkage of the control means now resolves the force of explosion into a resultant torque that is impressed on the cylinder power shaft 12 whereby the latter is rotated. As the pistons continue to rotate in a counter-clockwise direction past the exhaust port 45, the control mechanism again moves pistons 17 at a rate faster than that at which pistons 16 are moving, whereby the volume of the chamber 53 is decreased and the burned gases are forced outwardly through said port.

The control means imparts an identical relative oscillatory movement to the pistons 23, 24, thereby moving said pistons to a compressed position twice during each revolution thereof. At the instant a charge is being ignited in cylinder 10, maximum compression is obtained in cylinder 11 by the compressor, and the air or other fluid being compressed is discharged through one of the outlet ports 42 to a suitable pressure tank.

There is thus provided a power plant of simple construction, light weight and small size in combination with a compressor having similar advantages. The use of common control means, as in the form shown, reduces the weight and cost of manufacture. No distributor is required for the engine, since the charge is always fired at the same position in the cylinder. It has been found in actual tests that overheating does not result from this fact, due to the cooling capacity of the cooling fluid which passes around the cylinder and also due to the rapid scavenging action of the engine.

Although only one embodiment of the invention has been illustrated and described in detail, it is to be expressly understood that the same is not limited thereto. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In a power plant, a pair of coaxially disposed cylinders, a power shaft extending through said cylinders, pistons in each of the cylinders rigidly connected to said shaft, a sleeve surrounding said shaft in each cylinder and projecting therefrom, pistons rigidly connected to each of said sleeves, said second-named pistons being adapted for limited angular movement with respect to the first-named pistons, and means for controlling the relative movement between the pistons including arms connected to said sleeves, means rigidly interconnecting said arms, a pair of arms rigidly connected to said power shaft, the arms of said pair being on opposite sides of the axis of rotation of said shaft, and means for pivotally connecting said interconnected arms to said pair of arms.

2. In a power plant, a pair of coaxially disposed cylinders, a continuous power shaft extending through said cylinders, a sleeve in each of said cylinders mounted for limited rotary movement on said shaft, said sleeves extending exteriorly of the cylinders, pistons in each cylinder rigidly connected to said power shaft, pistons in each cylinder rigidly connected to said sleeves, and control means for operatively connecting the sleeves and shaft, said control means including pairs of arms rigidly connected to the sleeves, the arms on one sleeve having abutting engagement with the arms on the other sleeve, means for rigidly interconnecting said abutting arms, arms on the power shaft extending between each of the pairs of arms, pairs of links for connecting the power shaft arms to the sleeve arms, rollers carried by said links, and a cam engaged by the rollers.

3. In apparatus of the class described, a pair of coaxially disposed cylinders, a shaft extending coaxially therethrough, a sleeve in each cylinder mounted on said shaft for angular movement relative thereto, pistons in each cylinder connected to said shaft, pistons in each cylinder connected to said sleeves, and means including only one linkage mechanism for drivably connecting both of said sleeves to said shaft and controlling the movement of said sleeves relative to said shaft.

4. In apparatus of the class described, a pair of coaxially disposed cylinders, a shaft extending coaxially therethrough, means mounted on said shaft for angular movement relative thereto, a plurality of relatively movable pistons positioned in each of said cylinders on said shaft and means, and common means including only one linkage mechanism and only one endless cam surface disposed between said cylinders for controlling the relative movement of the pistons in the cylinders.

5. In apparatus of the class described, a pair of coaxially disposed cylinders, a plurality of pistons in each cylinder, means including coaxial, relatively movable members rotatable in said cylinders for connecting the pistons in one of said cylinders to the pistons in the other of said cylinders, and unitary control means for said pistons including only one linkage mechanism and only one continuous cam surface whereby pistons in each cylinder have relative angular movement when the same revolve about the axis of said cylinder.

6. In apparatus of the class described, a pair of coaxially disposed cylinders, a shaft extending therethrough, pistons in each cylinder rigidly connected to said shaft, a sleeve in each cylinder extending exteriorly thereof and mounted on said shaft for movement relative thereto, pistons in each cylinder mounted on said sleeves, a pair of arms secured to said shaft, a pair of arms secured to each of said sleeves, a plurality of rollers adapted to operate in a plane perpendicular to the axis of rotation of said shaft and passing through the arms on said shaft, means including pairs of links rotatably supporting said rollers and secured to said pairs of arms on said shaft and sleeves and constituting a parallelogram for operatively connecting said rollers to said pairs of arms, and a cam engaged by said rollers.

7. In apparatus of the class described, a pair of coaxially disposed cylinders, a shaft extending through said cylinders, a sleeve in each of said cylinders extending exteriorly thereof and rotatably mounted on said shaft, pistons in each cylinder rigidly connected to said shaft, pistons in each cylinder rigidly connected to said sleeves, and control means for controlling the movement of said sleeves relative to said shaft, said control means including a pair of arms on each of said sleeves, means connecting the outer ends of one pair of said arms to corresponding outer ends of the other pair of said arms, a pair of arms secured to said shaft and operable between the adjacent ends of said sleeves, means operatively connecting said first-named arms with said second-named arms including a plurality of rollers, and a cam engaged by said rollers.

CUMMINGS GARDNER.